Figure 4:
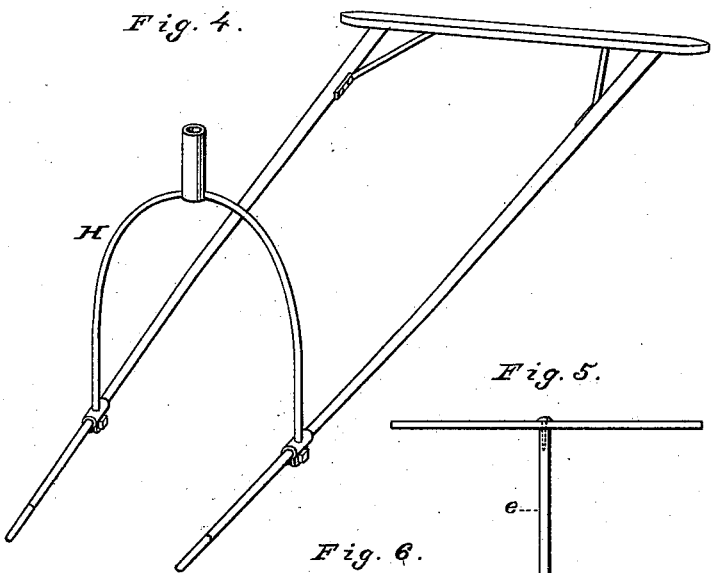
Figure 5:
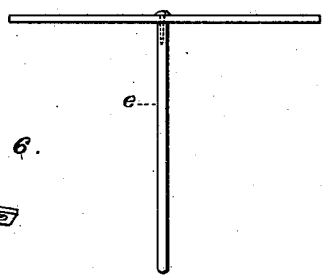
Figure 6:

(No Model.) 2 Sheets—Sheet 1.
E. E. DUTTON.
SUNSHADE ATTACHMENT FOR VEHICLES.
No. 378,829. Patented Feb. 28, 1888.
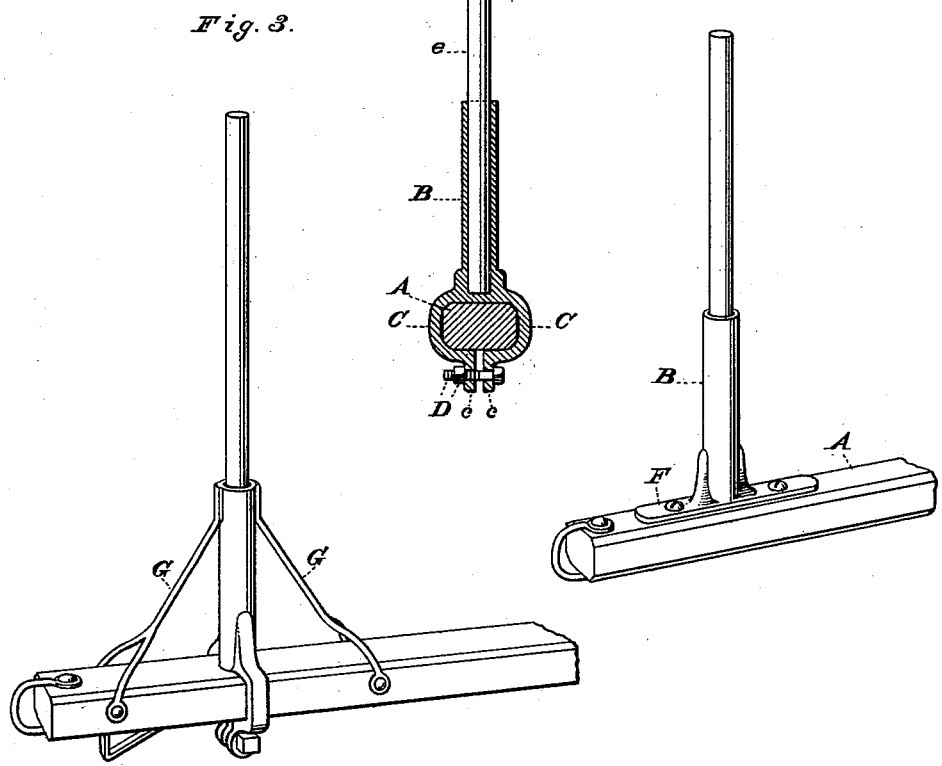
WITNESSES.
Villette Anderson
C. R. Ferguson
INVENTOR.
E. E. Dutton.
by E. W. Anderson,
Attorney.

(No Model.) 2 Sheets—Sheet 2.

E. E. DUTTON.
SUNSHADE ATTACHMENT FOR VEHICLES.

No. 378,829. Patented Feb. 28, 1888.

WITNESSES.
Villette Anderson.
C. R. Ferguson.

INVENTOR.
E. E. Dutton,
by E. W. Anderson,
Attorney.

UNITED STATES PATENT OFFICE.

ELMER ELSWORTH DUTTON, OF VINELAND, NEW JERSEY, ASSIGNOR TO JOHN PORCIUS GAGE, OF SAME PLACE.

SUNSHADE ATTACHMENT FOR VEHICLES.

SPECIFICATION forming part of Letters Patent No. 378,829, dated February 28, 1888.

Application filed November 12, 1887. Serial No. 255,029. (No model.)

*To all whom it may concern:*

Be it known that I, ELMER ELSWORTH DUTTON, a citizen of the United States, and a resident of Vineland, in the county of Cumberland and State of New Jersey, have invented certain new and useful Improvements in Devices for Protecting Animals from Sun or Rain; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a section through the tongue of a vehicle and the socket. Fig. 2 is a modification. Fig. 3 shows the device further strengthened by braces. Figs. 4, 5, 6, and 7 are modifications.

The invention relates to sheltering devices for horses harnessed to vehicles, the object being to provide means whereby such a device, either in the form of an umbrella or of a shelter that will extend over the whole of the animal, may be supported upon the tongue or thills of the vehicle; and it consists in the construction and novel combination of parts hereinafter described, illustrated in the accompanying drawings, and pointed out in the appended claim.

Referring to the drawings by letter, A designates the tongue of a vehicle, and B a socket resting at a proper point thereon. The said socket has the opposite arms, C, that surround the tongue, and are held tightly thereon by the bolt and nut D, that engage the opposite downwardly-extended ends, *c*. In the said socket rests the staff or handle *e* of the shelter E, which is in this case an umbrella, to shade and protect the heads of the horses. The arms of the socket surrounding the tongue may be omitted, if desired, and the socket provided with a base-plate, F, Fig. 2, screwed down to the tongue. The first modification is, however, preferable to any in which openings or recesses of any kind need to be made in the tongue or thills, as the same would be weakened thereby. Both of these devices may, if not thought strong enough, be supported by the front and rear brace-rods, G G, Fig. 3, running from the socket to the tongue.

If the device is to be attached to a thilled vehicle, the socket is supported centrally upon the arched bar H, Fig. 4, which passes over the back of the horse, and is provided at its ends with reduplications of the securing devices heretofore described.

Figure 7:
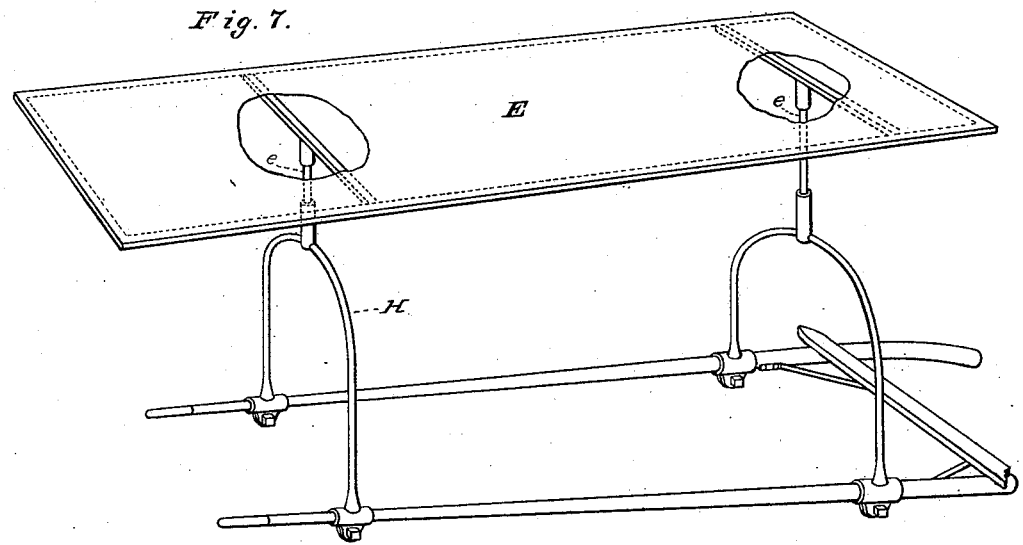

When the shelter is to extend over the entire animal, one of the described devices is secured to the tongue or thills near the front and one near the rear of the same. The cover or shelter, which is preferably made of canvas or equivalent light material, is attached to the tops of the rod *e*, that have to be used in this case preferably by transverse strips secured to the tops of said rods. I do not, however, desire to limit myself to this particular mode of securing the shelter, as it may be attached by thimbles, Fig. 6, that fit on the ends of the rods and are secured at corresponding points to the shelter, as shown in Fig. 7.

The device as herein described is cheap, of simple construction, easily attached, and useful in protecting the horses from the weather.

Having described my invention, I claim—

The combination, with the tongue of a vehicle, of the socket B, provided with the arms C, the bolt and nut D, the brace-rods G, supporting the socket on the tongue, the shelter, and the shelter-rod with its lower end inserted in the socket, substantially as specified.

In testimony whereof I affix my signature in presence of two witnesses.

ELMER ELSWORTH DUTTON.

Witnesses:
PETER BURDETTE,
A. N. GERAULT.